(12) United States Patent
Sumiyoshi et al.

(10) Patent No.: US 8,203,671 B2
(45) Date of Patent: Jun. 19, 2012

(54) VIEW ANGLE CONTROLLABLE DISPLAY DEVICE AND TERMINAL HAVING THE SAME

(75) Inventors: Ken Sumiyoshi, Tokyo (JP); Koji Mimura, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 953 days.

(21) Appl. No.: 11/683,926

(22) Filed: Mar. 8, 2007

(65) Prior Publication Data

US 2007/0229421 A1     Oct. 4, 2007

(30) Foreign Application Priority Data

Mar. 20, 2006   (JP) .................................. 2006-076269

(51) Int. Cl.
*G02F 1/1347*   (2006.01)
*G02F 1/1335*   (2006.01)
(52) U.S. Cl. ........... 349/75; 349/117; 349/119; 349/193
(58) Field of Classification Search ............ 349/75, 349/119, 117, 193
See application file for complete search history.

(56) References Cited

U.S. PATENT DOCUMENTS 6,628,369 B2 * 9/2003 Kumagai et al. ............. 349/194
2004/0080693 A1 * 4/2004 Kuzuhara et al. ............. 349/117
2005/0243265 A1 * 11/2005 Winlow et al. ................ 349/178

FOREIGN PATENT DOCUMENTS

| CN | 1340723 A | 3/2002 |
|---|---|---|
| CN | 1702517 A | 11/2005 |
| JP | 61-100726 A | 5/1986 |
| JP | 09-105958 A | 4/1997 |
| JP | 11-7045 A | 1/1999 |
| JP | 2005-309020 A | 11/2005 |
| JP | 2005-316470 A | 11/2005 |
| JP | 2006-11451 A | 1/2006 |
| JP | 2006-106439 A | 4/2006 |

* cited by examiner

*Primary Examiner* — Nathanael R Briggs
(74) *Attorney, Agent, or Firm* — Sughrue Mion, PLLC

(57) ABSTRACT

A display device, capable of changing view angle range and suitable for reducing thickness and weight, is provided. One compensating panel has such a structure that two polymer films, having birefringence, adhere to each other. The birefringence directions of the polymer films are parallel or orthogonal to the liquid crystal orientation direction. Similarly, another compensating panel has such a structure that two polymer films, having birefringence, adhere to each other. The birefringence directions of the polymer films are parallel or orthogonal to the liquid crystal orientation direction. Since the compensating panel does not include glass substrates but includes polymer films, the display device can be thin and light.

11 Claims, 15 Drawing Sheets

VIEW ANGLE CONTROLLABLE DISPLAY DEVICE AND TERMINAL HAVING THE SAME

BACKGROUND OF THE INVENTION

1. Field of the Invention

The present invention relates to a view angle controllable display device (hereinafter simply referred to as "display device") capable of changing the viewable angle range, and a terminal having the same.

2. Description of Related Art

With the recent development of technology, liquid crystal display devices viewable in wide angle range have been used practically. On the other hand, portable information terminals in which liquid crystal displays (LCD) are mounted have also been used widely. For such a portable information terminal, when obtained information is shared with someone, it is desirable that the display be viewable at wide angle. On the other hand, when it is used as a portable information terminal, the user may reluctant to be looked into the display by others. Therefore, the view angle range must be wide and narrow, depending on the used state. Japanese Patent Application Laid-Open No. 9-105958 (Patent Document 1) discloses a display device satisfying the above requirements.

FIGS. 14 and 15 show a display device disclosed in Patent Document 1. FIG. 14 is a cross-sectional view of a compensating panel, and FIG. 15 is an exploded perspective view of the display device. Hereinafter, description will be given based on these drawings.

As shown in FIG. 14, a compensating panel 101a is so configured that transparent electrode layers 104 and 105 are formed on opposite surfaces of a pair of glass substrates 102 and 103, and orientation films 106 and 107 made of polyimide or vinyl alcohol are formed thereon. Between the glass substrates 102 and 103, a liquid crystal layer 108 made of nematic liquid crystal or the like is formed. A compensating panel 101b has the same configuration as that of the compensating panel 101a.

As shown in FIG. 15, the compensating panels 101a and 101b constitute a display device 138, combined with a display panel 118 and polarizing plates 109 and 110. The polarizing plates 109 and 110 are arranged on the both sides of the display panel 118, and the compensating panels 101a and 101b are arranged between the display panel 118 and the polarizing plate 109.

Although not shown, the display panel 118 is so configured that a liquid crystal layer made of nematic liquid crystal or the like is filled in the space between a pair of glass substrates in which a transparent electrode layer and an orientation film are formed on the surfaces thereof, and it is sealed with a sealing member made of resin or the like. Each surface of the orientation film of the display panel 118 is rubbing-processed beforehand such that liquid crystal molecules are twist-oriented at about 90°. The rubbing direction of the orientation film on the glass substrate on the upper side is shown by the arrow 119 direction. The rubbing direction of the orientation film on the glass substrate on the lower side is shown by the arrow 120 direction which is orthogonal to the arrow 119.

In the compensating panels 101a and 101b, liquid crystal molecules are oriented so as to be parallel to the surfaces of the glass substrates 102 and 103 in the liquid crystal layers 108 when a voltage is not applied. The orientation directions 124 and 125, which are parallel thereto, are oriented so as to be parallel and orthogonal to the rubbing direction of the pair of glass substrates of the display panel 118, respectively. The compensating panels 101a and 101b are stacked in this manner.

The transparent axis 121 of the polarizing plate 109 and the transparent axis 122 of the polarizing plate 110 are arranged to be orthogonal to each other, and the transparent axis 122 of the polarizing plate 110 and the rubbing direction 120 of the orientation film on the lower side of the display panel 118 are parallel to each other. Therefore, it is in a normally white mode in which the display device 138 transmits light so as to perform white display when a voltage is not applied to the liquid crystal layer of the display panel 118.

When a voltage is not applied to the compensating panels 101a and 101b, the oscillating direction of light passed through the display panel 118 becomes parallel or vertical to the orientation directions 124 and 125 of the liquid crystal molecules of the compensating panels 101a and 101b. Therefore, when the display device 138 is viewed from the immediately above direction, no phase difference is caused even though light passed through the display panel 118 passes the compensating panels 101a and 101b. Therefore, an image which is nothing different from that of a conventional display device can be recognized.

In such a case, the phase shifts as the display device is viewed more obliquely, compared with a conventional display device. However, by optimizing the refractive index anisotropy an of the liquid crystal material of the compensating panels 101a and 101b or the cell gap between the compensating panels 101a and 101b, it is possible to display an image without involving a significant difference from the view angle characteristics of the conventional display device.

On the other hand, in a state where a voltage is applied to the compensating panels 101a and 101b, the liquid crystal molecules inside the liquid crystal layers 108 of the compensating panels 101a and 101b are arranged vertically to the glass substrates 102 and 103. Therefore, when the display device 138 is viewed from the right above, there is no change in the display characteristics. However, when the display device is viewed obliquely from any direction, a phase delay is caused when light passed through the display panel 118 passes through the compensating panels 101a and 101b. Therefore, it is possible to prevent an image from being recognized as an image.

In this way, by applying or not applying a voltage to the compensating panels 101a and 101b, it is possible to change the orientation state of the liquid crystal layer 108 to thereby change the view angle characteristics of the display device 138.

However, the display device disclosed in Patent Document 1 requires at least two compensating panels having a pair of glass substrates, which involves a problem that the device becomes very thick and heavy.

SUMMARY OF THE INVENTION

It is therefore an object of the present invention to provide a display device capable of changing the view angle range and suitable for reducing thickness and weight.

A display device according to the present invention comprises two polarizers, a liquid crystal display panel interposed between the two polarizers, and at least two compensating panels interposed between the two polarizers and the liquid crystal display panel, wherein at least one of the two compensating panels includes a pair of polymer films, liquid crystal interposed between the pair of polymer films and oriented, and an electrode which applies a voltage to the liquid crystal; and a birefringence direction of the polymer film and an orientation direction of the liquid crystal are almost parallel or almost orthogonal to each other. Further, another polarizing plate may be inserted in between the display panel and the two compensating panels.

The present invention may be configured as follows.

That is, a first invention is a view angle controllable display device which comprises two polarizers, a liquid crystal display panel interposed between the two polarizers, and at least two compensating panels interposed between the two polarizers and the liquid crystal display panel, wherein at least one of the two compensating panels includes a pair of polymer films, liquid crystal interposed between the pair of polymer films and oriented, and an electrode which applies a voltage to the liquid crystal; and a birefringence direction of the polymer film and an orientation direction of the liquid crystal are almost parallel or almost orthogonal to each other. By using the first invention, it is possible to reduce the angle range that a display image is viewable so as to improve secrecy of the display image. Additionally, a thinner and lighter display device can be provided. In this case, an inexpensive polymer film can be used, and further, the front image will not be degraded and the display can be used without uncomfortable feeling.

A second invention is the view angle controllable display device according to the first invention, in which at least one of the two compensating panels has compensating segments, to each of which a voltage can be applied independently. By using the second invention, a complex pattern can be displayed while being overlapped on a display image within the screen when viewed from an oblique direction. Thus, visibility from an oblique direction is further lowered so as to improve secrecy of the display image.

A third invention is the view angle controllable display device according to one of the first to second invention, in which operations of two compensating panels or operations of respective compensating segments can be selected in time series. By using the third invention, a pattern which is changed temporally can be created, so visibility from an oblique direction is further lowered.

A fourth invention is the view angle controllable display device according to one of the first to third inventions, in which at least one of the two compensating panels includes a liquid crystal layer which is in parallel orientation when a voltage is not applied. A fifth invention is the view angle controllable display device according to one of the first to third inventions, in which at least one of the compensating panels includes a liquid crystal layer which is in vertical orientation when a voltage is not applied. By using the fourth or fifth invention, compensating panels can be formed by means of a typical method of manufacturing a liquid crystal panel.

EFFECT OF THE INVENTION

According to the display device of the present invention, a compensating panel includes polymer films. Therefore, the display device can be reduced in thickness and weight.

DESCRIPTION OF PREFERRED EMBODIMENTS

Figure 1:
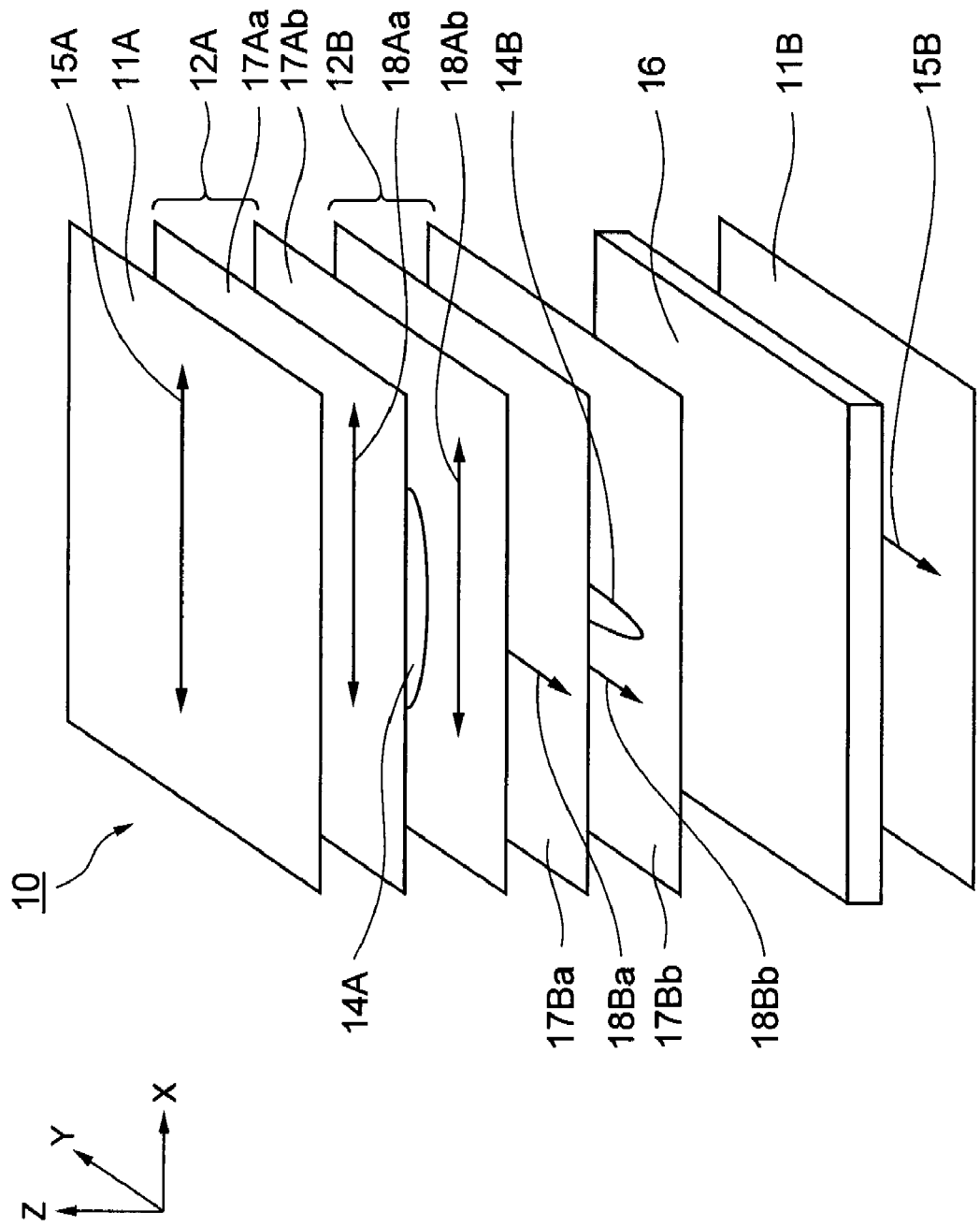
FIG. 1 is an exploded perspective view showing a first embodiment (first example) of a display device according to the present invention.

FIG. 1 is an exploded perspective view showing a first embodiment (first example) of a display device according to the present invention. Hereinafter, description will be given based on FIG. 1.

A display device 10 of the present embodiment has such a configuration that a stacked structure of a display panel 16 and two compensating panels 12A and 12B is provided between two polarizing plates 11A and 11B. The compensating panels 12A and 12B are arranged such that the liquid crystal orientation directions 14A and 14B, when a voltage is applied or not applied, are orthogonal to each other. In other words, the liquid crystal orientation directions 14A and 14B of the compensating panels 12A and 12B are orthogonal to each other when a voltage is not applied, or are orthogonal to each other when a voltage is applied and the orientation directions are changed within the surfaces. In order to simplify the description, the liquid crystal orientation directions 14A and 14B are assumed to be orthogonal to each other when a voltage is not applied. The liquid crystal orientation direction 14A of the compensating panel 12A is an X direction, and the liquid crystal orientation direction 14B of the compensating panel 12B is a Y direction.

In order to limit the view angle in the Y-Z direction, a voltage is applied to the compensating panel 12A. In such a case, liquid crystal molecules in the X direction rise in the compensating panel 12A, whereby the luminous changes in the Y-Z plane. On the other hand, in order to limit the view angle in the X-Z direction, a voltage is applied to the compensating panel 12B. In such a case, liquid crystal molecules in the Y direction rise in the compensating panel 12B, whereby the luminous changes in the X-Z plane. Further, when a voltage is applied to the compensating panels 12A and 12B simultaneously, liquid crystal molecules of both compensating panels 12A and 12B rise, whereby luminous in the X-Z direction and luminous in the Y-Z direction change simultaneously. Since the changes occur simultaneously, the range where luminous is limited becomes larger, compared with the case of applying a voltage separately.

The compensating panel 12A has such a structure that two polymer films 17Aa and 17Ab having birefringence adhere to each other. The optical axis direction of the polymer films 17Aa and 17Ab (birefringence directions 18Aa and 18Ab) is parallel or orthogonal to the liquid crystal orientation direction 14A. Similarly, the compensating panel 12B has such a structure that two polymer films 17Ba and 17Bb having birefringence adhere to each other. The optical axis direction of the polymer films 17Ba and 17Bb (birefringence directions 18Ba and 18Bb) is parallel or orthogonal to the liquid crystal orientation direction 14B.

In the display device disclosed in Patent Document 1, at least two sets of compensating panels having a pair of glass substrates are required. This causes the device to be very thick and heavy. To solve the problem, a compensating panel may consist of extremely thin polymer films. However, a polymer film generally has large birefringence. The birefringence (retardation) of a polymer film is usually not less than 1000 nm. On the other hand, the birefringence of a liquid crystal layer of a compensating panel is about several hundreds nm. Therefore, the birefringence of a liquid crystal display may be buried due to the birefringence of the polymer film. On the other hand, a polymer film having low birefringence has been considered recently, but such a film is expensive generally. Therefore, a thin configuration using inexpensive polymer films, capable of operating without being affected by large birefringence of the polymer films, is desired. The present embodiment provides this configuration.

The compensating panel 12A in the first example (FIG. 1) of the present embodiment is so configured that two polymer films 17Aa and 17Ab adhere to each other via a liquid crystal layer (not shown) and are arranged such that the birefringence directions 18Aa and 18Ab coincide with the liquid crystal orientation direction 14A. Similarly, the compensating panel 12B is so configured that polymer films 17Ba and 17Bb are arranged such that the birefringence directions 18Ba and 18Bb coincide with the liquid crystal orientation direction 14B.

The compensating panel 12A in the second example (FIG. 2) of the present embodiment is so configured that the two polymer films 17Aa and 17Ab adhere to each other via a liquid crystal layer (not shown), and are arranged such that the birefringence directions 18Aa and 18Ab are orthogonal to the liquid crystal orientation direction 14A. Similarly, the compensating panel 12B is so configured that the polymer films 17Ba and 17Bb are arranged such that the birefringence directions 18Ba and 18Bb are orthogonal to the liquid crystal orientation direction 14B.

The compensating panel 12A in the third example (FIG. 3) of the present embodiment is so configured that the birefringence directions 18Aa and 18Ab of the two polymer films 17Aa and 17Ab are orthogonal to each other, and the birefringence direction 18Ab of one polymer film 17Ab coincides with the liquid crystal orientation direction 14A. Similarly, the compensating panel 12B is so configured that birefringence directions 18Ba and 18Bb of two polymer films 17Ba and 17Bb are orthogonal to each other, and the birefringence direction 18Bb of one polymer film 17Bb coincides with the liquid crystal orientation direction 14B.

By arranging the polymer films 17Aa, ... as described above, the birefringence direction 18Aa of the polymer film 17Aa coincides with or is orthogonal to the transparent axis 15A of the polarizing plate 11A positioned above. Therefore, the front image will not be changed when the compensating panel 12A is not operated. Further, when the compensating panel 12A is operated, only the liquid crystal layer thereof is inclined to be oriented. The transmittance property when viewed obliquely is determined depending on a birefringent body having an optical axis inclined to the substrate surface. Therefore, the birefringence of the polymer films 17Aa, ... will not affect the front image when the compensating panel 12A is operated.

FIGS. 4 to 7 are exploded perspective views showing a second embodiment (first to fourth examples) of the display device according to the present invention. Hereinafter, description will be given based on these drawings.

A display device 20 of the first example (FIG. 4) is so configured that a polarizing plate 11C is inserted between the compensating panel 12B and the display panel 16 in the configuration shown in FIG. 1. The transmission axis 15C of the polarizing plate 11C is in the X direction.

Figure 2:
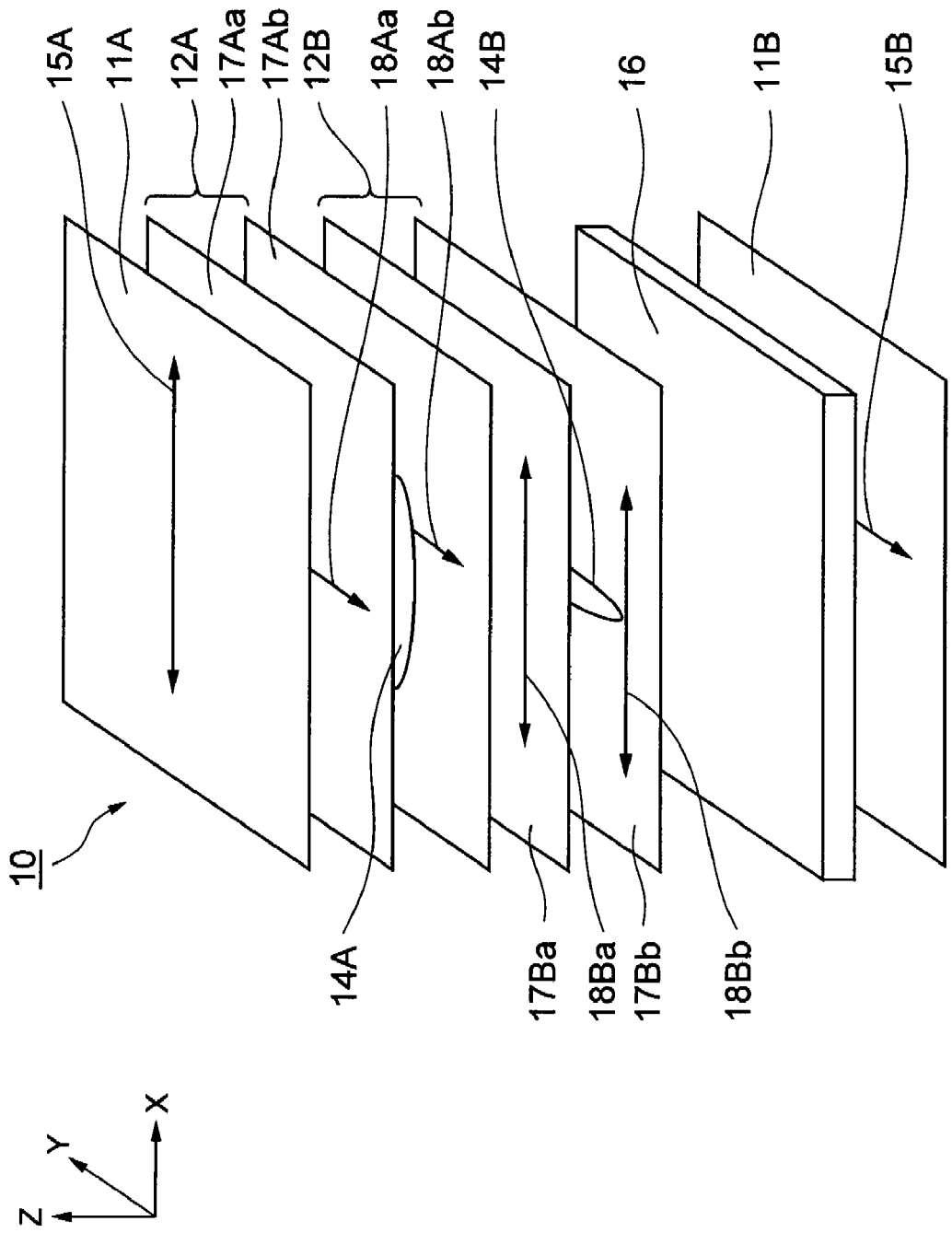
FIG. 2 is an exploded perspective view showing the first embodiment (second example) of the display device according to the present invention.

The display device 20 of the second example (FIG. 5) is so configured that the polarizing plate 11C is inserted between the compensating panel 12B and the display panel 16 in the configuration shown in FIG. 2. The transmission axis 15C of the polarizing plate 11C is in the X direction.

Figure 3:
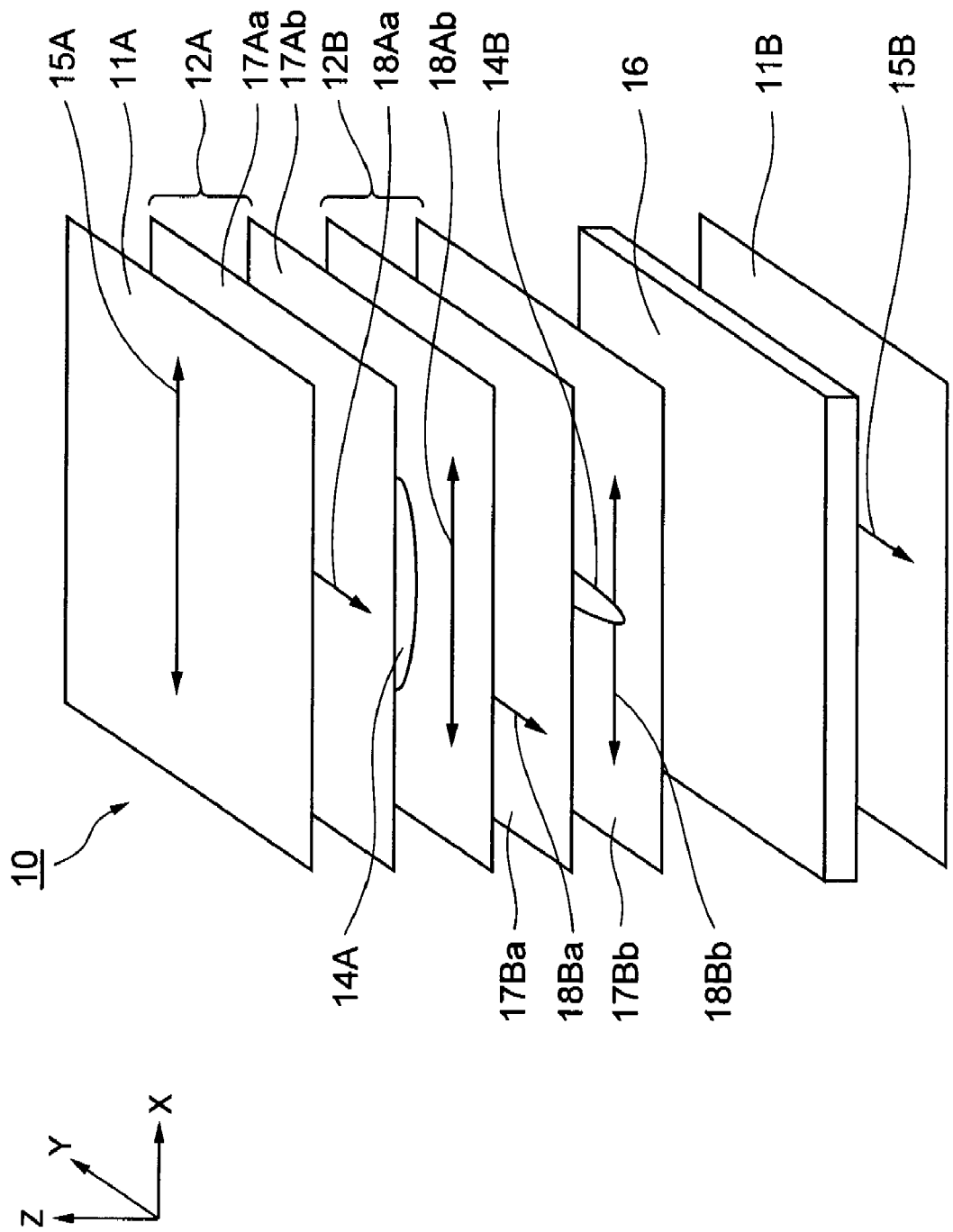
FIG. 3 is an exploded perspective view showing the first embodiment (third example) of the display device according to the present invention.

The display device 20 of the third example (FIG. 6) is so configured that the polarizing plate 11C is inserted between the compensating panel 12B and the display panel 16 in the configuration shown in FIG. 3. The transmission axis 15C of the polarizing plate 11C is in the X direction.

Generally, birefringence of the polymer film 17Aa, ... is very large, so the contrast ratio of the front image is lowered in the configuration of the first embodiment (FIGS. 1 to 3) unless the adhering accuracy of the above and below polymer films 17Aa, ... is high. In order to prevent this problem, the configurations of the present embodiment (FIGS. 4 to 6) are desirable. In each of the configurations of the present embodiment, the polarizing plates 11A and 11C are inserted above and below the compensating panels 12A and 12B. Therefore, the function of the compensating panels 12A and 12B is only to generate angle distribution of the luminous. On the other hand, the contrast ratio of the front image is determined only by the display panel 16 having the polarizing plates 11C and 11B above and below. Therefore, even if an angular shift is caused when attaching the above and below polymer films 17Aa, ..., only angle distribution of the luminous changes slightly, and the contrast ratio of the front image is not lowered.

Figure 4:
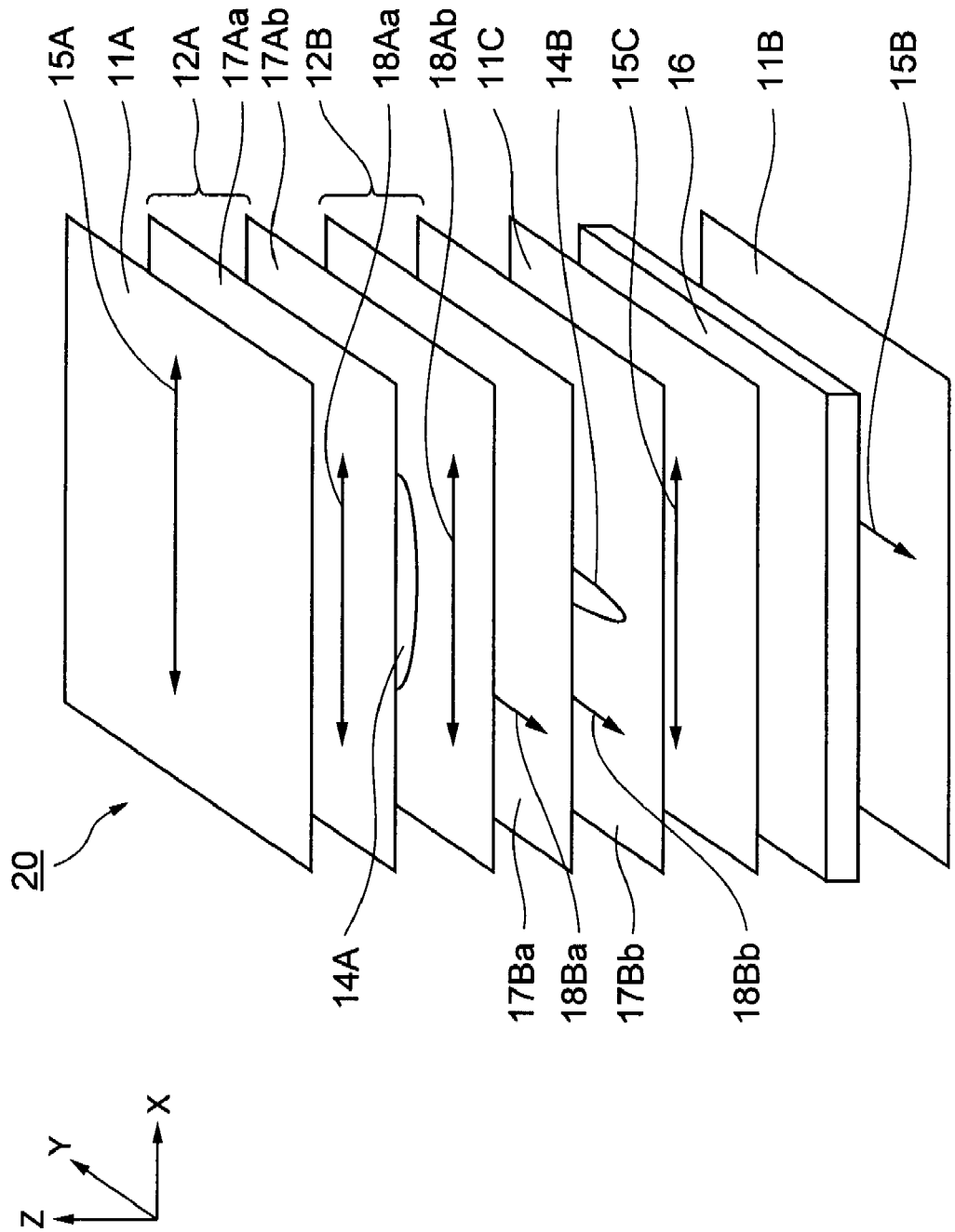
FIG. 4 is an exploded perspective view showing a second embodiment (first example) of a display device according to the present invention.
Figure 5:
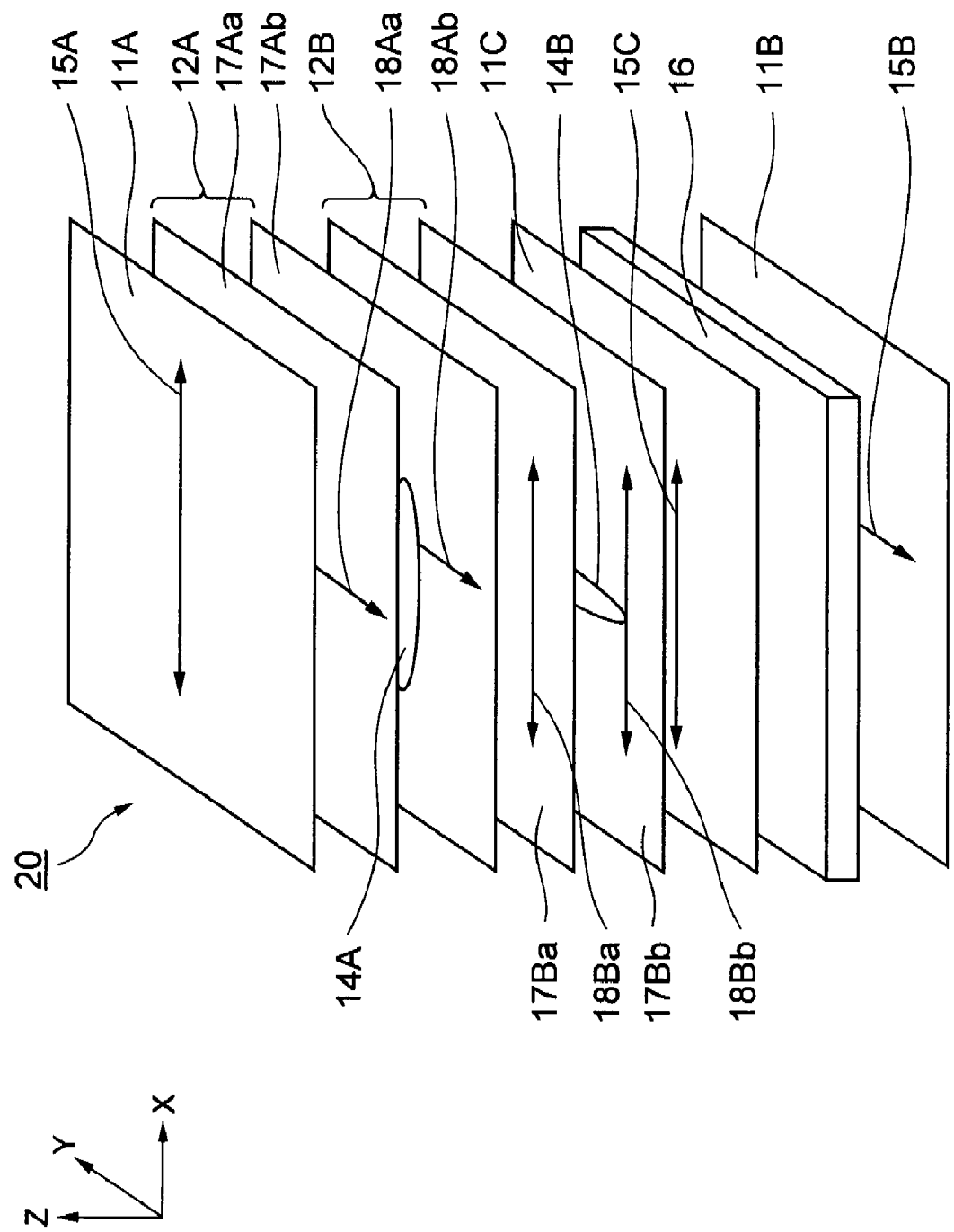
FIG. 5 is an exploded perspective view showing the second embodiment (second example) of the display device according to the present invention.
Figure 6:
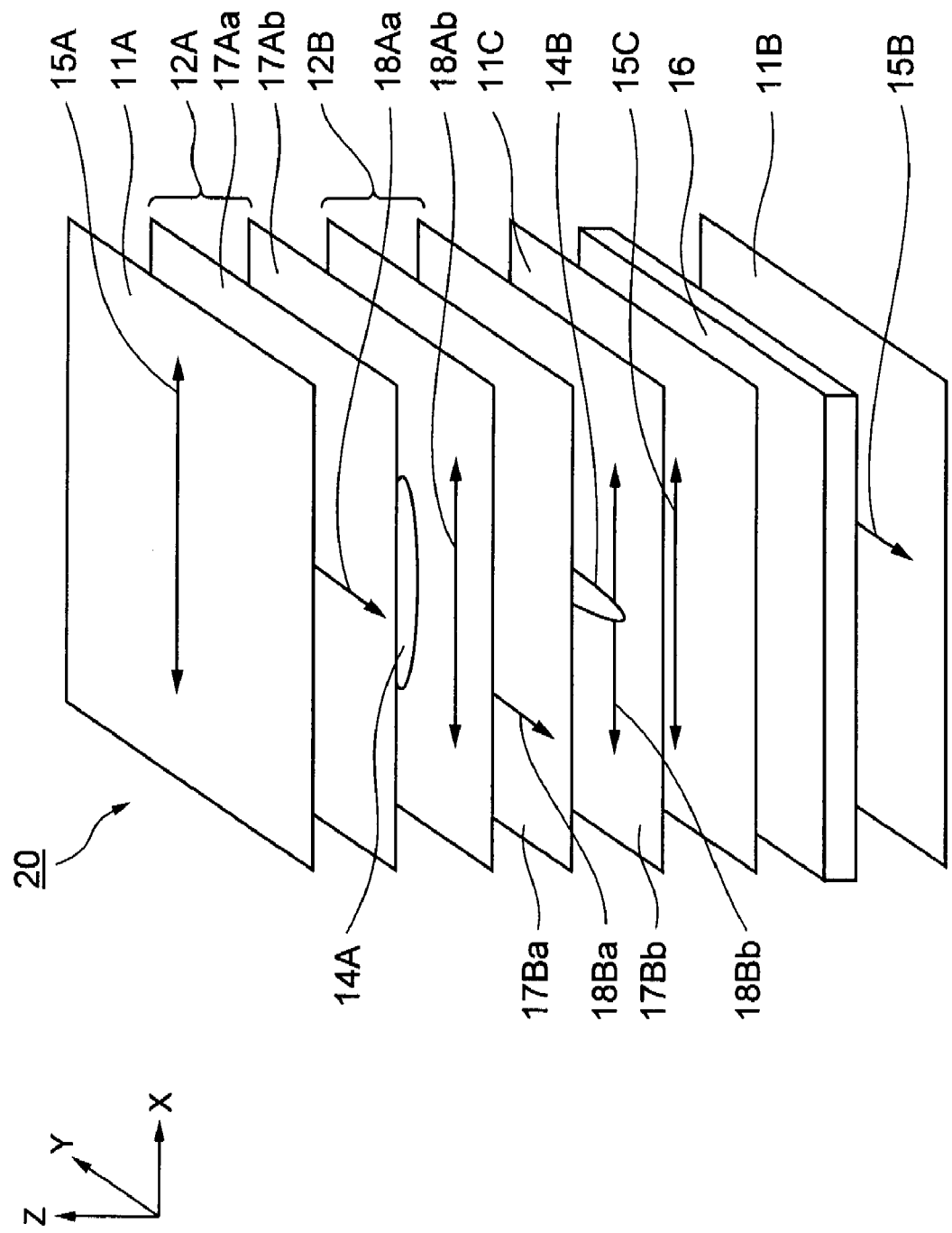
FIG. 6 is an exploded perspective view showing the second embodiment (third example) of the display device according to the present invention.
Figure 7:
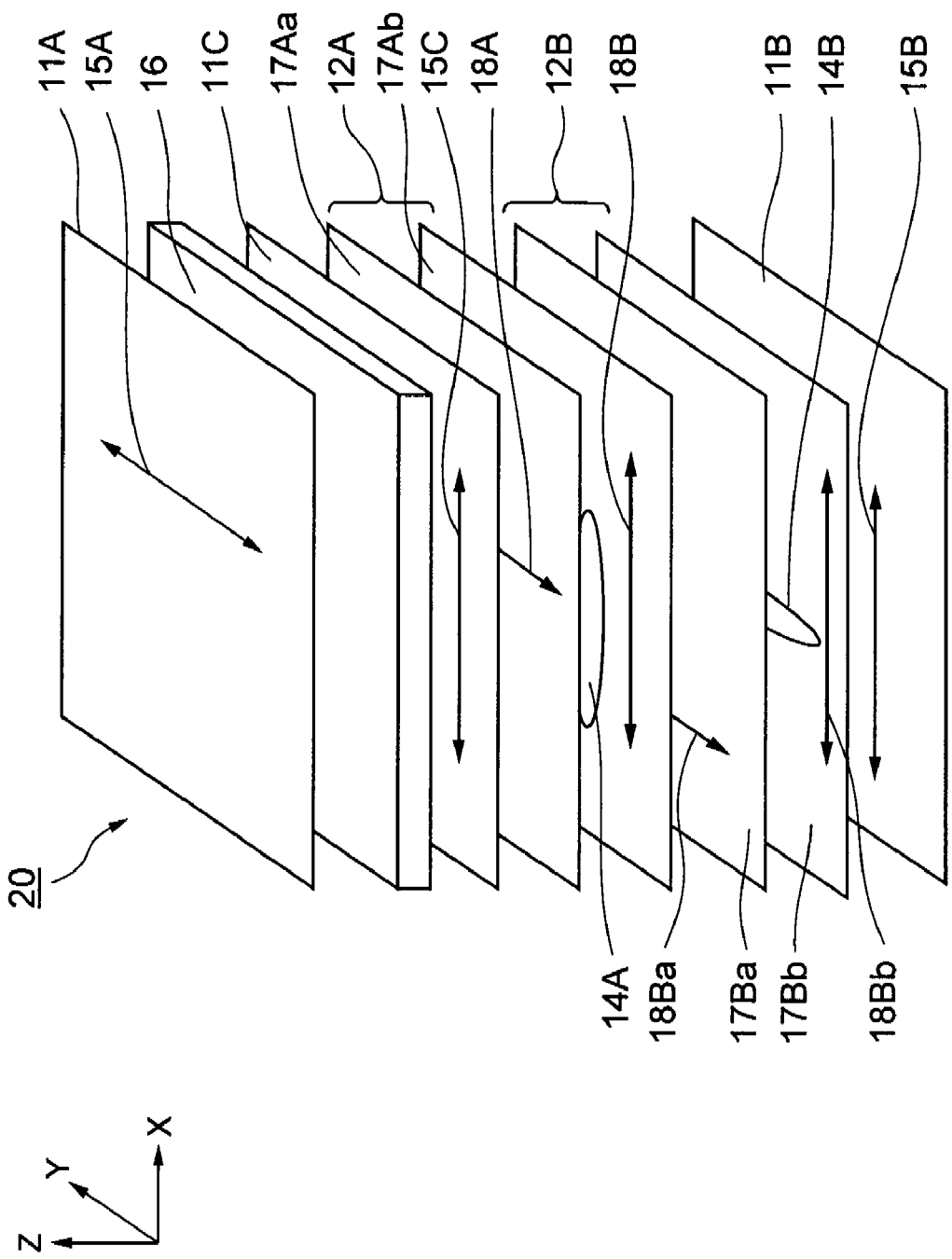
FIG. 7 is an exploded perspective view showing the second embodiment (fourth example) of the display device according to the present invention.

In each of the configurations of FIGS. 4 to 6, the compensating panels 12A and 12B are stacked on the display panel 16. However, as shown in FIG. 7 (fourth example), the same effect can be achieved even if the compensating panels 12A and 12B are stacked below the display panel 16.

Figure 8:
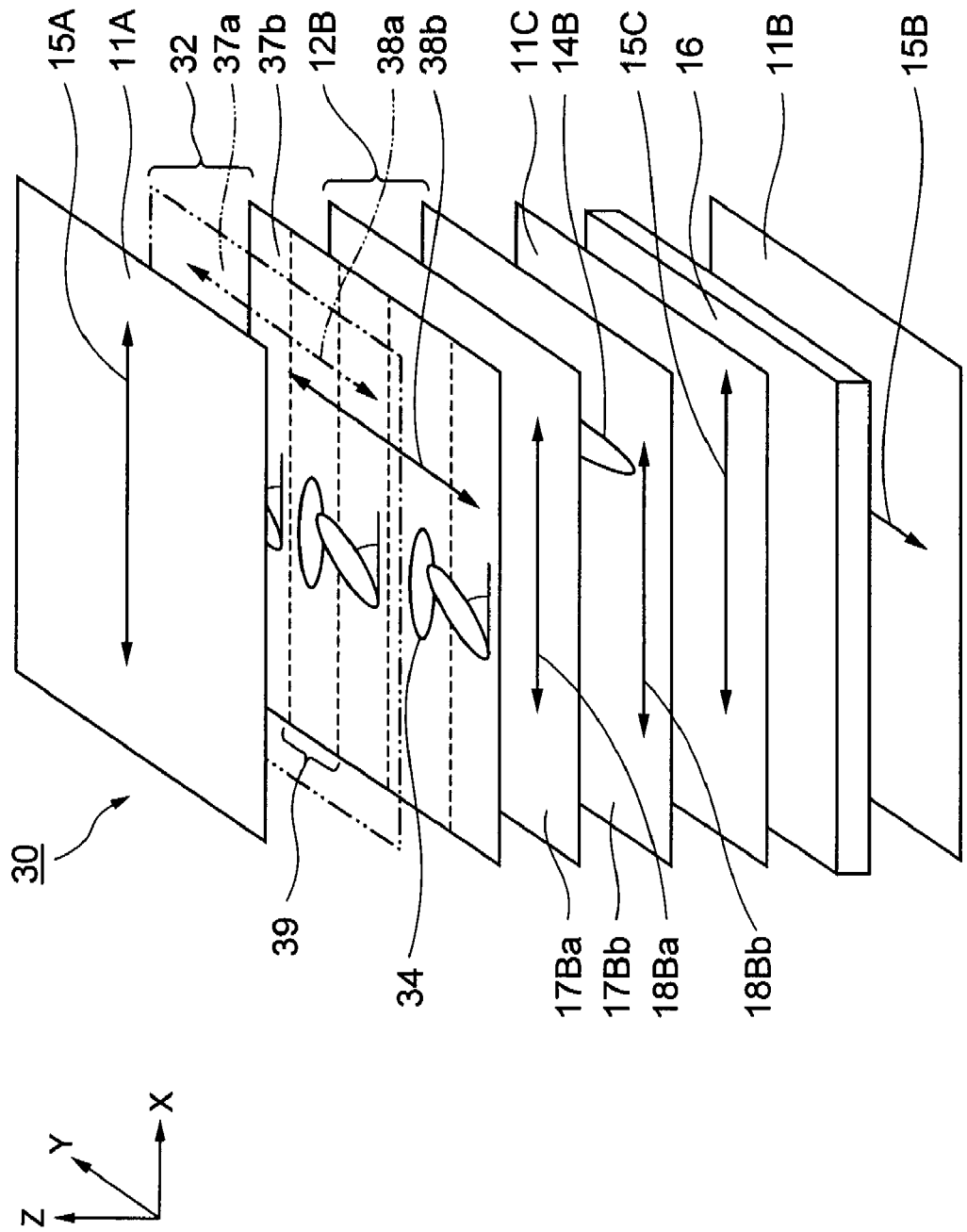
FIG. 8 is an exploded perspective view showing a third embodiment of a display device according to the present invention.

FIG. 8 is an exploded perspective view showing a third embodiment of the display device according to the present invention. Hereinafter, description will be given based on FIG. 8.

A display device 30 of the present embodiment is different in a compensating panel 32 from the configuration of FIG. 5. The compensating panel 32 includes a plurality of compensating segments 39 to each of which a voltage can be applied independently, whereby voltage distribution can be created in the liquid crystal layer of the compensating panel 32.

In the present embodiment, the transparent electrode of the polymer film 37*b* is patterned such that parts to which a voltage can be applied and parts to which a voltage cannot be applied are divided. Therefore, by applying a voltage to the transparent electrode, nonuniform distribution of the liquid crystal orientation direction 34 can be created within the plane. A unit of change in the liquid crystal orientation direction 34 is called a compensating segment 39. In the parts to which a voltage is applied, luminous is lowered in the oblique direction as described above. On the other hand, in the parts to which a voltage is not applied, luminous is not changed in the oblique direction. Therefore, by changing the electrode pattern, it is possible to create a space pattern having more complex luminous change. As described above, by creating more complex luminous change, an image not easily viewable from an oblique direction can be created.

Note that in FIG. 8, the polymer film 37*a* is shown by a virtual line in order to show the compensating segments 39 and the liquid crystal orientation directions 34. Further, even in the compensating panel 12B, compensating segments can be formed same as those of the compensating panel 32.

Figure 9:
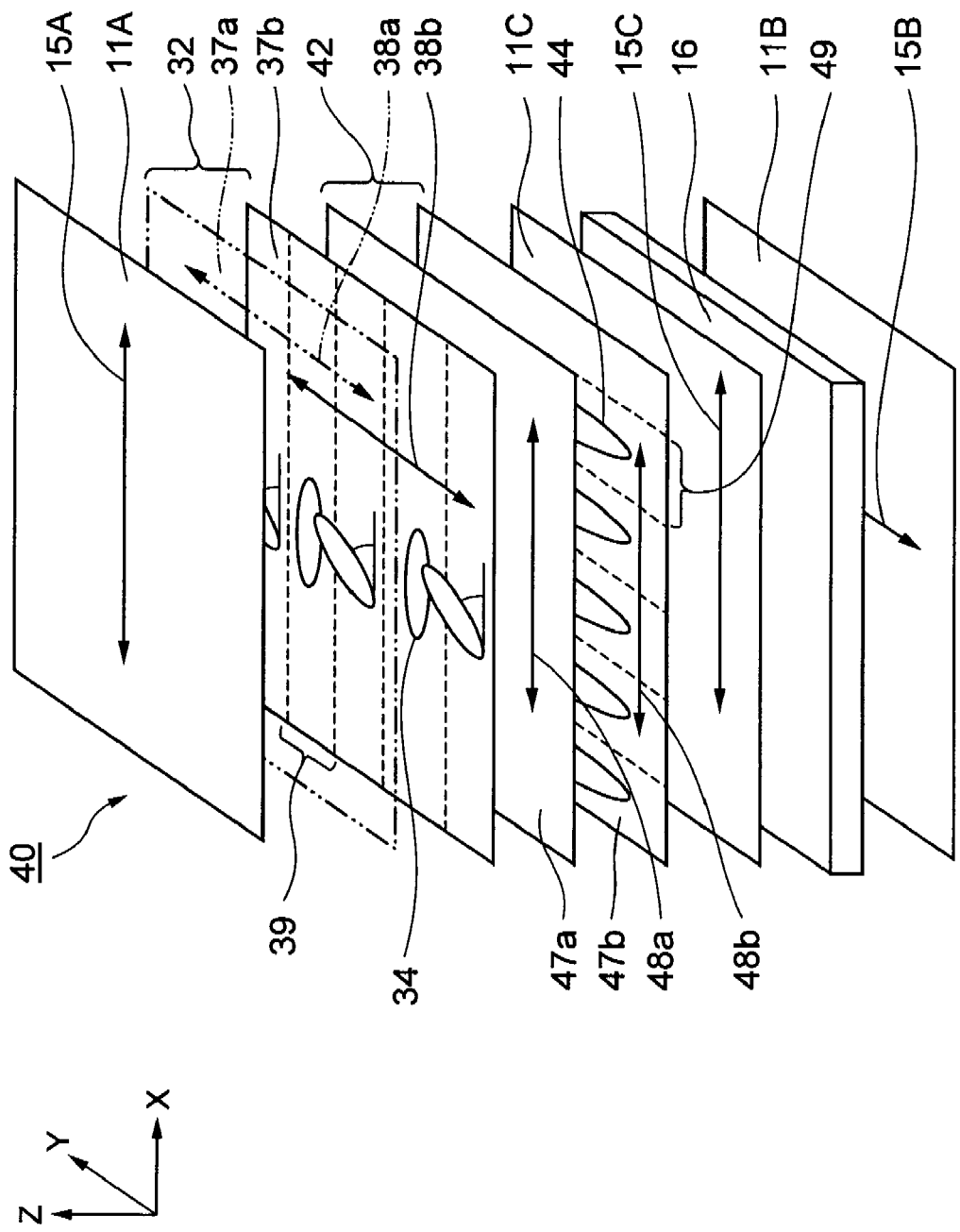
FIG. 9 is an exploded perspective view showing a fourth embodiment of a display device according to the present invention.

FIG. 9 is an exploded perspective view showing a fourth embodiment of the display device according to the present invention. Hereinafter, description will be given based on FIG. 9.

A display device 40 of the present embodiment is different in a compensating panel 42 from the configuration of FIG. 8. That is, the compensating panel 42 includes a plurality of compensating segments 49, whereby operations of the two compensating panels 32 and 42 or operations of the respective compensating segments 39 and 49 can be selected in time series.

In the present embodiment, the two compensating panels 32 and 42 have the compensating segments 39 and 49 of different structures, respectively. Therefore, by operating the compensating panel 32, the pattern corresponding to the compensating segments 39 appears when viewed obliquely. On the other hand, by operating the compensating panel 42, the pattern corresponding to the compensating segments 49 appears when viewed obliquely. When operating both compensating panels 32 and 42 simultaneously, the pattern in which both compensating segments 39 and 49 are overlapped is viewed from an oblique direction. As described above, by changing the pattern caused when viewed from an oblique direction in time series, more complex pattern can be added to an image. Thereby, it is possible to make visibility from an oblique direction more difficult.

Figure 10:
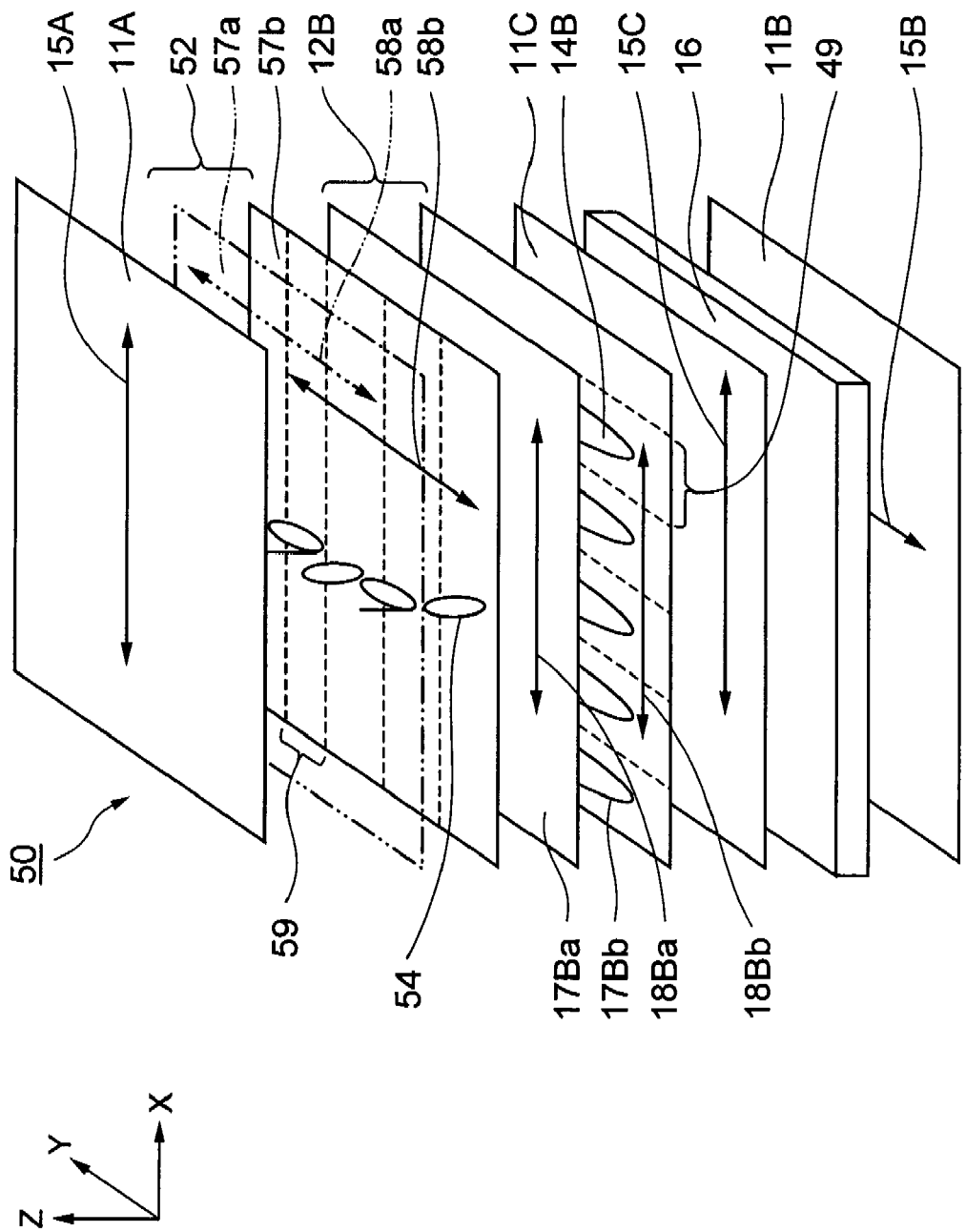
FIG. 10 is an exploded perspective view showing a fifth embodiment of a display device according to the present invention.

FIG. 10 is an exploded perspective view showing a fifth embodiment of a display device according to the present invention. Hereinafter, description will be given based on FIG. 10.

A display device 50 of the present embodiment is different in a compensating panel 52 from the configuration of FIG. 9. That is, the compensating panel 52 has a liquid crystal layer which is vertically oriented when a voltage is not applied (liquid crystal orientation direction 54). In such a case, the in-plate orientation angle at which the liquid crystal is inclined when a voltage is applied must be 0° or 90° with respect to the transmission axis 15A of the polarizing plate 11A above. The present embodiment has the same effect as those of the other embodiments.

Figure 11:
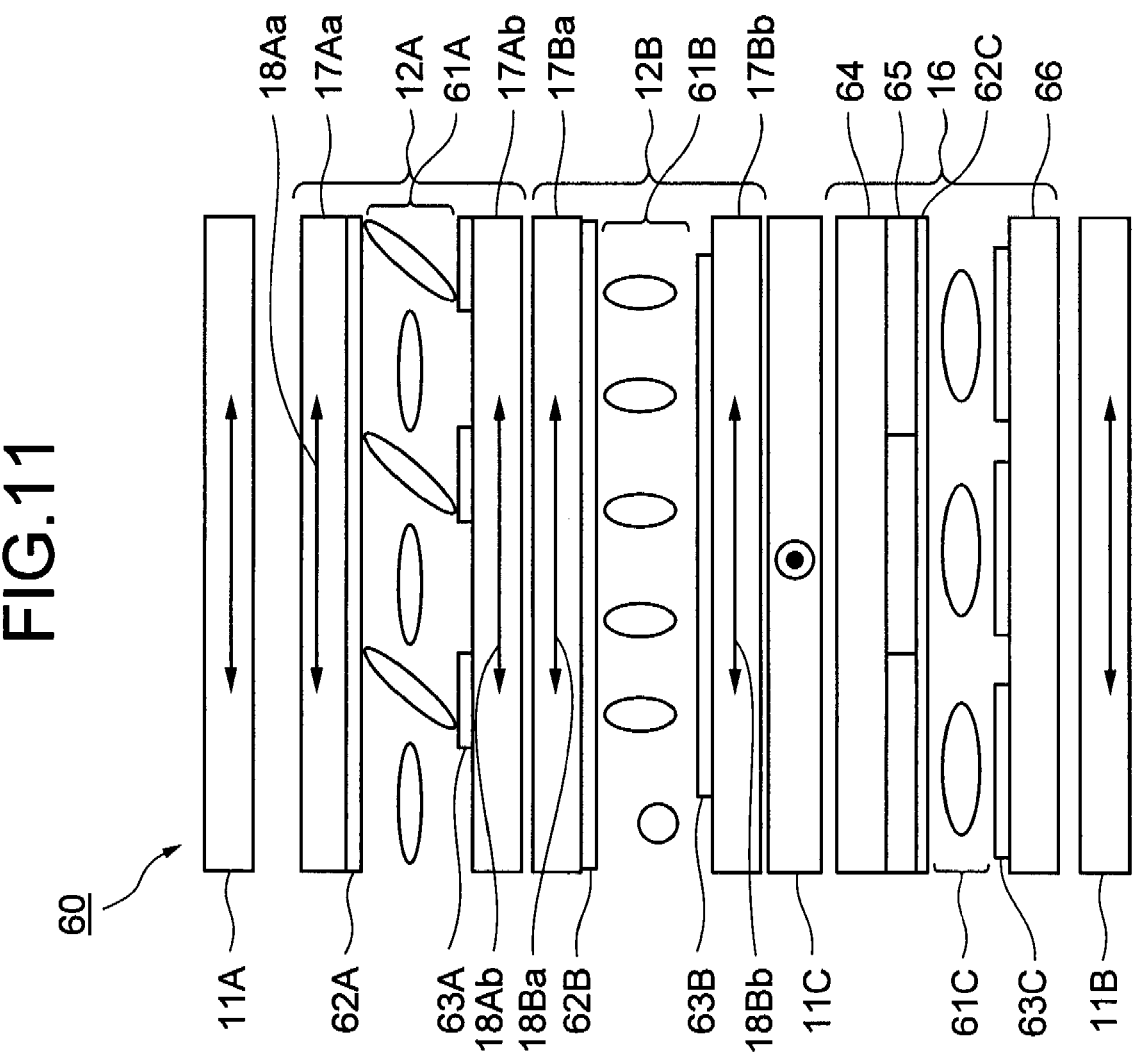
FIG. 11 is a schematic cross-sectional view showing a sixth embodiment of a display device according to the present invention.

FIG. 11 is a schematic cross-sectional view showing a sixth embodiment of a display device according to the present invention. Hereinafter, description will be given based on FIG. 11.

The present invention is made more specific than the previous embodiment. A display device 60 of the present embodiment uses a liquid crystal display device of a thin film transistor array drive, as the display panel 16. As a liquid crystal layer 61C of the display panel 16, any liquid crystal display mode can be used. For example, twisted nematic liquid crystal, liquid crystal of a lateral electric field drive system, and a vertical orientation liquid crystal may be used.

On the other hand, as the compensating panel 12A, one in which two polymer films 17Aa and 17Ab adhere to each other via a liquid crystal layer 61A is used. Similarly, as the compensating panel 12B, one in which two polymer films 17Ba and 17Bb adhere to each other via a liquid crystal layer 61B is used. As the polymer film 17Aa, . . . , anything can be selected.

A method of forming the compensating panel 12A using the polymer films 17Aa and 17Ab may be one conforming to a typical method of forming a liquid crystal panel. That is, if a parallel orientation liquid crystal layer is used as the compensating panel 12A, orientation films are formed on the polymer films 17Aa and 17Ab, and orientation processing such as rubbing is performed thereto. On the other hand, if a vertical orientation liquid crystal layer is used as the compensating panel 12A, orientation films causing vertical orientation are formed on the polymer films 17A and 17Ab. Then, two polymer films 17Aa and 17Ab are attached to each other via a spacer, and a liquid crystal layer 61A is filled in. At this time, the birefringence direction of the polymer films 17A and 17Ab and the rubbing direction are made coincide. Further, when the polymer films 17Aa and 17Ab are attached, both birefringence directions are also made coincide. This also applies to the compensating panel 12B.

On the polymer films 17Aa and 17Ab, transparent electrodes (in the present embodiment, a common electrode 62A and a segment electrode 63A) having been patterned are prepared. Further, the two compensating panels 12A and 12B are arranged such that their segment electrodes 63A and 63B are orthogonal to each other.

Next, operation of the display device 60 will be described. In general use, a voltage is not applied to the two compensating panels 12A and 12B. Therefore, the angle dependency of a display image is mainly determined by the angle dependency of the display panel 16 itself. By using a lateral electric field system or a multi-domain vertical orientation as the display panel 16, a display image recognizable in a wide view angle range is created.

On the other hand, when a voltage is applied to the two compensating panels 12A and 12B, luminance in an oblique direction is lowered in parts corresponding to the compensating segments of the respective compensating panels 12A and 12B. Therefore, when an image is viewed from an oblique direction, a complex display image in which images of the respective compensating segments of the compensating panels 12A and 12B overlap the original display image is viewed. Particularly, in a part where the respective compensating segments of the compensating panels 12A and 12B are overlapped, the orientation characteristic shows high directivity. Therefore, when viewed from an oblique direction, the image of this area is missing. From the two effects described above, viewing a display image from an oblique direction becomes difficult significantly.

Figure 12:
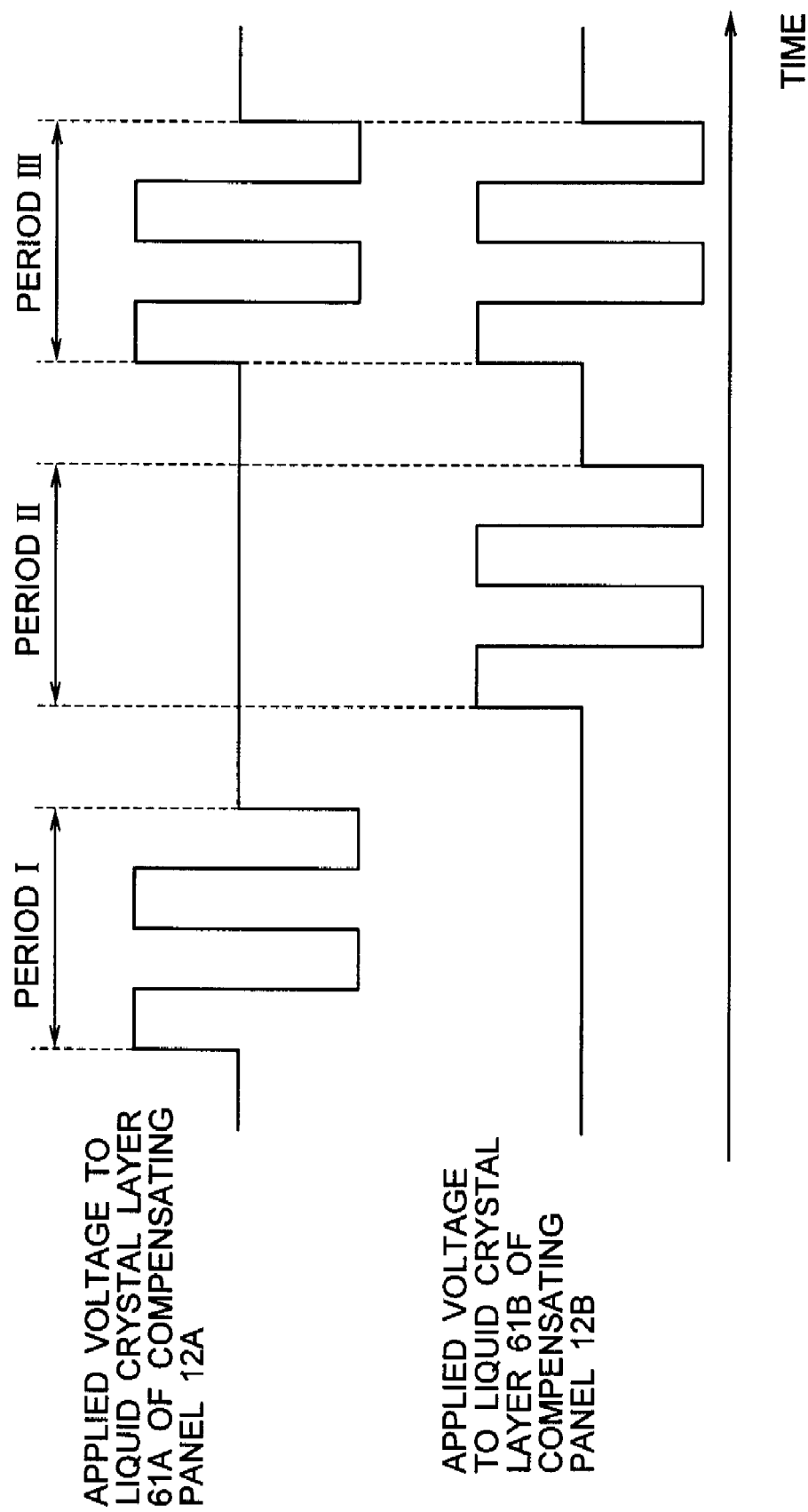
FIG. 12 is a time chart showing the operation of the sixth embodiment.

Further, timing of a voltage being applied to the respective compensating panels 12A and 12B can be made as shown in FIG. 12. In such a case, only the compensating panel 12A operates in a period I, and only the compensating panel 12B operates in a period II, and the compensating panels 12A and 12B operate in a period III. By setting each period to about one second, the image viewed from an oblique direction changes. As described above, by adjusting timing to apply voltage to the compensating panels 12A and 12B, a more complex pattern can be created on the time axis. Therefore, it is more difficult for a viewer from an oblique direction to read a display image.

Figure 13:
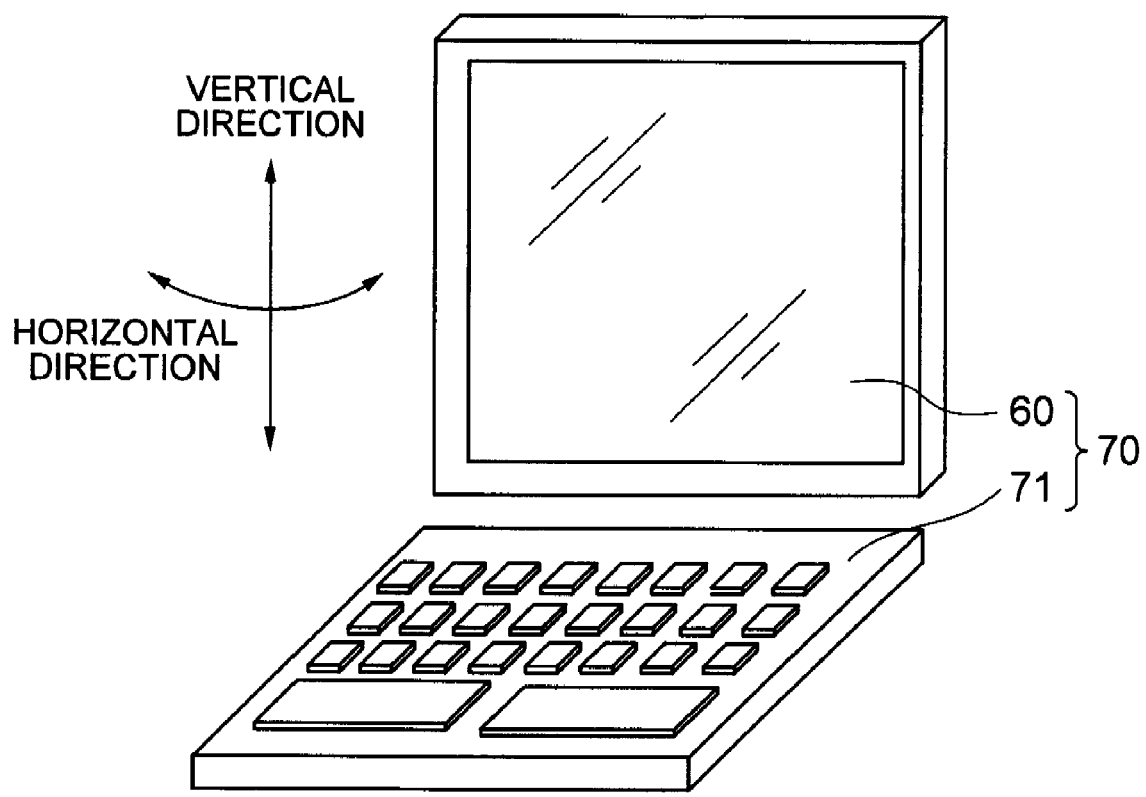
FIG. 13 is a perspective view showing an embodiment of a terminal according to the present invention.
Figure 14:
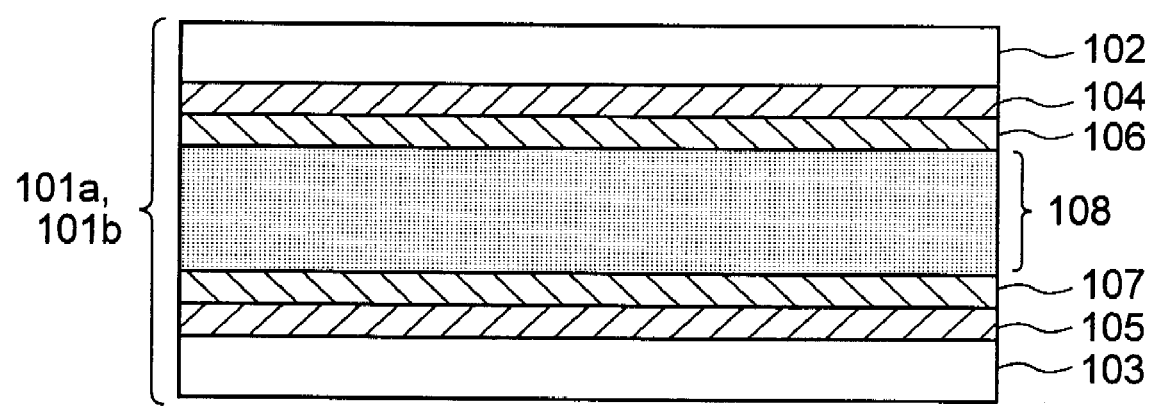
FIG. 14 is a cross-sectional view showing a compensating panel in a conventional display device.
Figure 15:
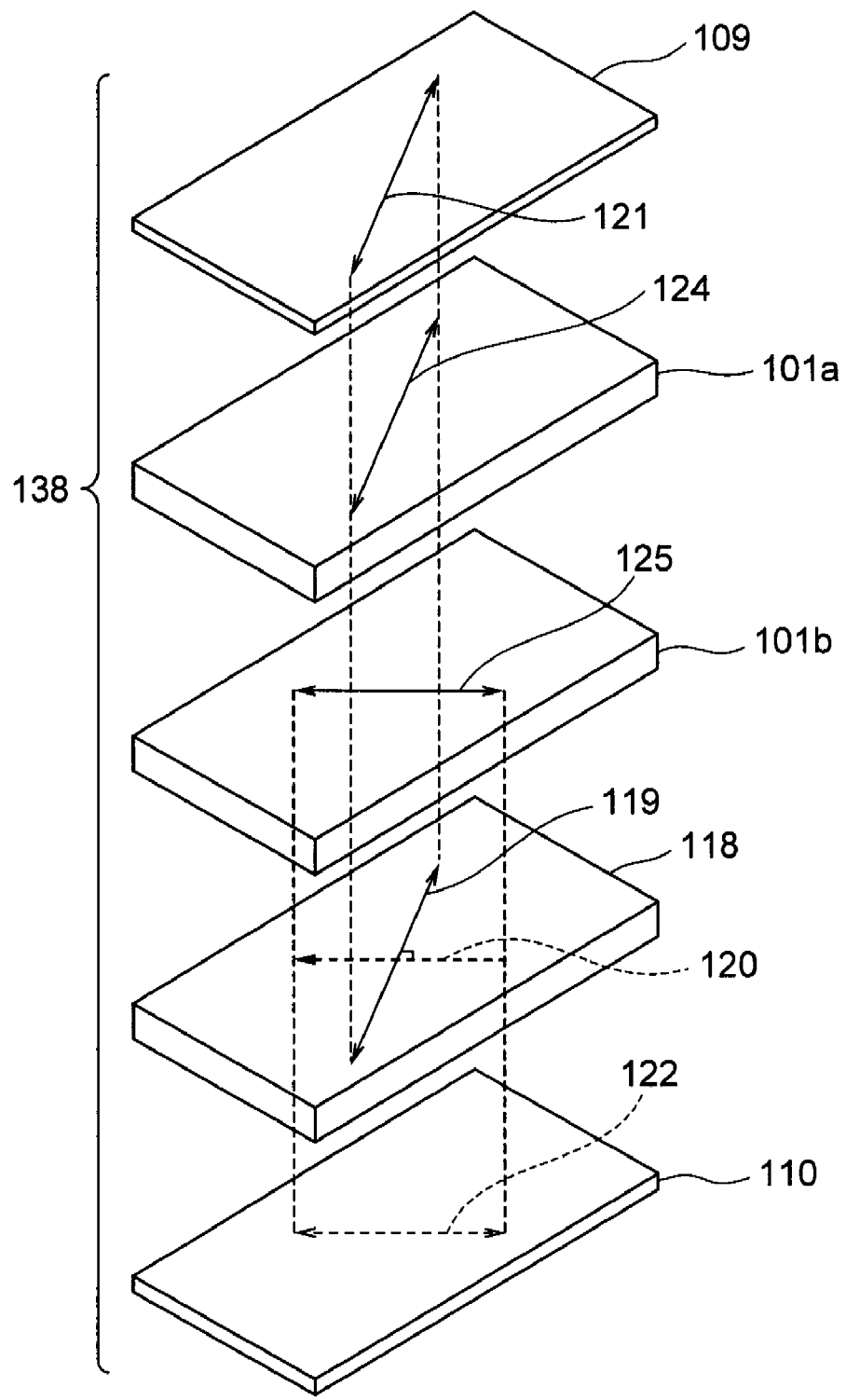
FIG. 15 is an exploded perspective view showing a conventional display device.

FIG. 13 is a perspective view showing an embodiment of a terminal according to the present invention. Hereinafter, description will be given based on FIG. 13.

A terminal 70 of the present embodiment includes the display device 60 of FIG. 11, and a main body 71 including a keyboard, a microcomputer and the like. The display device 60 and the main body 71 can perform wired or wireless communications with each other. By mounting the display device 60 on the terminal 70, it is possible to operate the compensating panel when displaying confidential information so as to prevent an image from being viewed by a person other than the terminal user. As the terminal 70, fixed equipment such as an ATM and EWS or portable equipment such as a PDA and a mobile phone may be used.

What is claimed is:

1. A view angle controllable display device, comprising:
   two polarizers;
   a liquid crystal display panel interposed between the two polarizers; and
   at least two compensating panels interposed between one of the two polarizers and the liquid crystal display panel, wherein both of the two compensating panels include:
      a pair of polymer films having a retardation value of not less than 1000 nm;
      liquid crystal interposed between the pair of polymer films and oriented; and
      an electrode which applies a voltage to the liquid crystal;
   a birefringence direction of the polymer films and an orientation direction of the liquid crystal are substantially parallel or substantially orthogonal to each other,
   wherein birefringence directions of two polymer films, from among the pairs of polymer films, are substantially orthogonal to each other,
   wherein birefringence directions of the other two polymer films, from among the pairs of polymer films, are also substantially orthogonal to each other, and
   wherein the pair of polymer films are each optically single-axial.

2. The view angle controllable display device, according to claim 1, further comprising another polarizing plate inserted in between the display panel and the two compensating panels.

3. The view angle controllable display device, according to claim 1, wherein at least one of the two compensating panels has a plurality of compensating segments, to each of which a voltage can be applied independently.

4. The view angle controllable display device, according to claim 1, wherein the two compensating panels operate differently in time sequence.

5. The view angle controllable display device, according to claim 3, wherein the plurality of compensating segments operate differently in time sequence.

6. The view angle controllable display device, according to claim 1, wherein the liquid crystal of at least one of the two compensating panels is in parallel orientation when the voltage is not applied.

7. The view angle controllable display device, according to claim 1, wherein the liquid crystal of at least one of the two compensating panels is in vertical orientation when the voltage is not applied.

8. A terminal having the view angle controllable display device according to claim 1.

9. The view angle controllable display device, according to claim 1, wherein each one of the pair of polymer films has an optical single-axis that is included within a surface of the respective one of the pair of polymer films.

10. The view angle controllable display device, according to claim 9, wherein the birefringence direction of the polymer films is a direction at which retardation becomes a maximum or a minimum.

11. The view angle controllable display device, according to claim 10, wherein the birefringence direction of the polymer films is a direction at which retardation becomes the minimum.

* * * * *